US008054918B2

(12) United States Patent
Vis et al.

(10) Patent No.: US 8,054,918 B2
(45) Date of Patent: *Nov. 8, 2011

(54) WIRELESS COMMUNICATION SYSTEM AND METHOD WITH FREQUENCY BURST ACQUISITION FEATURE USING AUTOCORRELATION

(75) Inventors: Marvin L. Vis, Boulder, CO (US); Jing Liang, Superior, CO (US); Richard T. Behrens, Layfayette, CO (US); Samuel Rousselin, Rennes (FR)

(73) Assignee: St-Ericsson S.A., Plan-Les-Ouates (CH)

( * ) Notice: Subject to any disclaimer, the term of this patent is extended or adjusted under 35 U.S.C. 154(b) by 1584 days.

This patent is subject to a terminal disclaimer.

(21) Appl. No.: 10/955,584

(22) Filed: Sep. 30, 2004

(65) Prior Publication Data
US 2006/0067437 A1 Mar. 30, 2006

(51) Int. Cl.
H03D 1/00 (2006.01)
H04L 27/06 (2006.01)

(52) U.S. Cl. .................. 375/343; 375/231; 375/152

(58) Field of Classification Search .................. 375/343, 375/344, 150, 152, 148, 317, 326, 141–144, 375/133
See application file for complete search history.

(56) References Cited

U.S. PATENT DOCUMENTS

| 5,621,766 | A | 4/1997 | Bakke et al. |
| 5,748,680 | A | 5/1998 | Mobin |
| 6,005,857 | A | 12/1999 | Honkasalo et al. |
| 6,327,469 | B1 | 12/2001 | Gaastra |
| 6,349,196 | B1 | 2/2002 | Bourzeix |
| 6,393,071 | B1 | 5/2002 | Bourzeix |
| 6,480,555 | B1 | 11/2002 | Renard et al. |
| 6,490,262 | B1 | 12/2002 | Hogger |
| 7,110,349 | B2 * | 9/2006 | Branlund et al. ............. 370/203 |
| 7,142,584 | B1 * | 11/2006 | Bomer et al. ................. 375/145 |
| 7,170,924 | B2 * | 1/2007 | Corbaton et al. ............ 375/148 |
| 7,187,731 | B2 * | 3/2007 | Popper .......................... 375/344 |
| 2002/0176485 | A1 * | 11/2002 | Hudson .......................... 375/144 |
| 2002/0181622 | A1 * | 12/2002 | Boutros et al. ................ 375/343 |
| 2003/0058965 | A1 * | 3/2003 | Ezquerra-Moreu et al. .. 375/319 |
| 2005/0197064 | A1 * | 9/2005 | Ibrahim et al. ............... 455/41.2 |
| 2007/0116159 | A1 * | 5/2007 | Popper .......................... 375/344 |
| 2007/0184806 | A1 * | 8/2007 | Yang et al. .................... 455/307 |

OTHER PUBLICATIONS

Avitabile, Peter, "Basics of Spectrum Analysis/Measurements and FFT Analyzer", University of Massachusetts Lowell, 2001.
Related Case—Liang et al, "Wireless Communication System and Method With Frequency Burst Acquisition Feature Using Autocorrelation", U.S. Patent Application filed Sep. 30, 2004.
Related Case—Gong et al., "Wireless Communication System and Method With Hardware-Based Frequency Burst Detection", U.S. Patent Application filed Sep. 30, 2004.

(Continued)

Primary Examiner — Chieh M Fan
Assistant Examiner — Qutbuddin Ghulamali
(74) Attorney, Agent, or Firm — Howison & Arnott, L.L.P.

(57) ABSTRACT

A wireless communication system is provided that detects a frequency burst (FB) through analysis of the autocorrelation function of received signals. The system can accommodate the relatively large frequency offsets that are associated with less expensive reference frequency crystals. The system employs a multi-mode filter including an FB filter and a channelization filter. In one embodiment, the FB filter is employed until an FB is located and then, once the FB is located, the channelization filter is employed to receive signals.

40 Claims, 8 Drawing Sheets

OTHER PUBLICATIONS

Seppanen, Jarno, "Audio Signal Processing Basics", Tampere University of Technology, Finland, Signal Processing Laboratory, 1999.
Related Case—Sooch, et al., "Highly Integrated Radio-Frequency Apparatus and Associated Methods", U.S. Appl. No. 10/426,042, filed Apr. 29, 2003.
Willassen, Svein Y., "The GSM System", 1998.
"Frequency Domain", Wikipedia, 2004, http://en.wikipedia.org/wiki/Frequency_domain.
"Fourier Transform", Wikipedia, 2004, http://en.wikipedia.org/wiki/Fourier_transform.
"Time Domain", Wikipedia, 2004, http://en.wikipedia.org/wiki/Time_domain.

* cited by examiner

WIRELESS COMMUNICATION SYSTEM AND METHOD WITH FREQUENCY BURST ACQUISITION FEATURE USING AUTOCORRELATION

CROSS REFERENCE TO RELATED PATENT APPLICATIONS

This patent application is related to the U.S. patent application entitled "Highly Integrated Radio-Frequency Apparatus and Associated Methods", inventors Navdeep S. Sooch and G. Tyson Tuttle, Ser. No. 10/426,042 filed Apr. 29, 2003, the disclosure of which is incorporated herein by reference in its entirety.

This patent application is also related to the U.S. patent application entitled "Wireless Communication System and Method With Hardware-Based Frequency Burst Detection", inventors Gong et al., (Ser. No. 10/954,791 and filed the same day as this application) the disclosure of which is incorporated herein by reference in its entirety.

This patent application is related to the U.S. patent application entitled "Wireless Communication System and Method With Frequency Burst Acquisition Feature Using Autocorrelation", inventors Liang et al, (Ser. No. 10/955,569 and filed the same day as this application) the disclosure of which is incorporated herein by reference in its entirety.

TECHNICAL FIELD OF THE INVENTION

The disclosures herein relate generally to wireless communication systems and more particularly to the detection of frequency burst signals used in such systems.

BACKGROUND

Mobile wireless communications systems, such as GSM/GPRS (Global System Mobile/General Packet Radio Service) systems, include base stations that can communicate with large numbers of mobile stations. The base stations periodically transmit a reference signal known as a frequency burst (FB) on a broadcast control channel (BCCH) to enable the mobile stations to synchronize with the base stations. The purposes of the frequency burst are twofold, namely frequency synchronization and coarse timing. First, with respect to frequency synchronization of the mobile station, the frequency burst enables correction of the frequency offset or error between the local carrier frequency of the mobile station and the carrier frequency of the base station. Second, with respect to coarse timing, approximate time alignment with the beginning of the frequency burst is performed so that a fine tuning can be conducted in the later acquisition of a sync burst (SB) from the base station.

As the radio frequency bands employed for wireless communication become more crowded, the possibility of interference from other radio frequency sources has increased substantially. For example, it is possible that a GSM wireless network may need to co-exist with legacy analog cellular networks and other digital cellular networks in the same frequency band. For this reason, a frequency burst acquisition technique should be able to distinguish between a frequency burst and a continuous wave (CW) signal or a very narrowband signal of other potential interfering systems.

A key factor in frequency burst acquisition by the mobile station is its ability to tolerate a wide range of frequency offset. Frequency offset in the mobile station is typically caused by temperature variation of the crystal that is used as a time base reference for the mobile station. Even when crystal accuracy is enhanced in a digital compensated crystal oscillator (DCXO), the undesired offset may still be substantial due to factors such as crystal aging, factory calibration inaccuracy and temperature variation. Expensive crystals tend to be more accurate but less desirable from the price perspective. Inexpensive crystals are more susceptible to offset problems but are more desirable from the price perspective.

What is needed is an apparatus and methodology which achieves accurate frequency burst acquisition with large frequency offset tolerance. Moreover, it is desirable that this be achieved while using relatively inexpensive crystals or other references as time bases.

SUMMARY

Accordingly, in one embodiment, a method is disclosed for acquiring a radio frequency burst (FB) signal in a wireless communication device. The method includes receiving a signal to provide a received signal that is an FB candidate. The method further includes determining autocorrelation function values of the received signal. The method also includes determining if the autocorrelation function values of the received signal exhibit a substantial peak. The method further includes designating the received signal as an FB signal if the autocorrelation function values thereof exhibit a substantial peak.

In another embodiment, a method is disclosed for acquiring a radio frequency burst (FB) signal in a wireless communication device. The method includes receiving a signal to provide a received signal. The method also includes filtering the received signal with an FB filter when performing an FB search. The method further includes designating the received signal as an FB signal if autocorrelation function values thereof exhibit a substantial peak.

In yet another embodiment, a method is disclosed for acquiring a radio frequency burst (FB) signal in a wireless communication device. The method includes receiving a signal and filtering the received signal with an FB filter while performing an FB search. The method further includes designating the received signal as an FB if autocorrelation function values thereof exhibit a substantial peak. Filtering by the FB filter is performed until an FB is detected for the received signal. However, in this embodiment, once an FB is detected, then the received signal is filtered with a normal channelization filter.

BRIEF DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION

Figure 1:
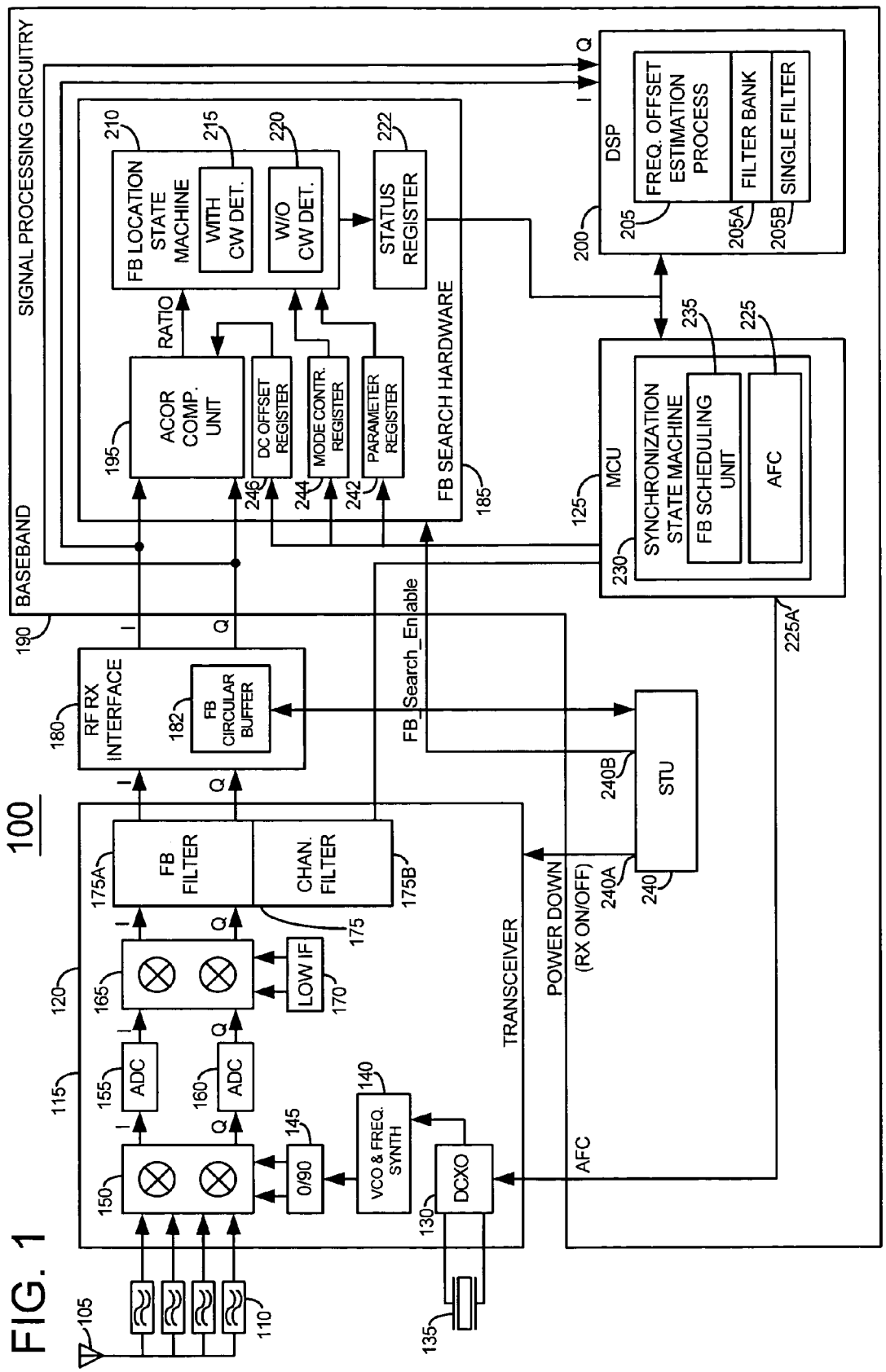
FIG. 1 is an illustrative block diagram of one embodiment of the disclosed wireless communication system, for example a mobile telephone apparatus.

FIG. 1 is a block diagram of one embodiment of the disclosed wireless communication system 100, for example a mobile telephone apparatus. A high level discussion of the operation of the system is presented first followed by a more detailed discussion of the subsystems forming system 100. System 100 includes an antenna 105 which is coupled to a surface acoustic wave (SAW) filter 110. In this embodiment SAW filter 110 is configured to select a radio frequency (RF) signal from one of four bands, namely the GSM 850, E-GSM 900, DCS 1800, and PCS 1900 MHz bands. Those skilled in the art will appreciate that the system is readily adapted to operate on bands other than those given in this particular example.

SAW filter 110 is coupled to an RF transceiver subsystem 115, the receiver 120 of which is illustrated in FIG. 1. Signal processing circuitry 190 includes a micro-controller unit (MCU) 125 that controls the operation of the subsystems of wireless communication system 100. MCU 125 is illustrated as having an automatic frequency control (AFC) output 225A which is coupled to an input of a digitally controlled crystal oscillator (DCXO) 130 to control the operating frequency of the DCXO. However, the line connecting AFC output 225A to DCXO 130 represents a logical connection. In actual practice the MCU 125 writes frequency adjustment information to an MCU peripheral (not shown) and that MCU peripheral communicates the information to an RF control port (not shown) of RF circuitry 115. The AFC output may be located in either MCU 125 or DSP 200. A crystal 135 is coupled to DCXO 130 to provide a time base reference to the DCXO. DCXO 130 provides a reference frequency signal to a frequency synthesizer 140 which is coupled thereto. The output of frequency synthesizer 140 is coupled via a 0°/90° phase shifter 145 to an analog mixer 150. Phase shifter 145 shifts the phase of the signals provided thereto by either 0 degrees or 90 degrees. Thus, when the output signal of shifter 145 is combined with the received signal in analog mixer 150, the signal is separated into in-phase (I) and quadrature (Q) components.

The in phase (I) and quadrature (Q) components are converted from analog signals to digital signals by analog to digital converters (ADCs) 155 and 160, respectively. The resultant digital I and digital Q signals are then provided to a digital mixer 165 which is coupled to a low intermediate frequency block 170 to down-convert the digital I and Q signals to baseband frequencies. A dual mode filter 175 is coupled to digital mixer 165 to separate the I and Q signals at baseband from adjacent signals outside of the pass bands of the filter. In conventional designs, a filter is normally centered on the nominal carrier frequency where the mobile station is operating. To include the desired signal within the pass band, the bandwidth of the filter needs to be large enough to cover the worst cases with maximum positive and maximum negative frequency offset. By doing so, an inherent disadvantage is that it reduces isolation from adjacent channel signals, which can leak into the pass band and act as interference sources. The GSM/GPRS specification defines an FB signal to be positioned at approximately 67.7 kHz beyond the nominal carrier frequency. In the disclosed embodiment, an FB search custom filter 175A is employed when the frequency offset can be relatively large. The center frequency of this custom filter 175A is chosen to be between the nominal carrier frequency and the corresponding FB frequency, and the bandwidth of the filter is narrower than for the reception of other types of GSM/GPRS burst, such as synchronization burst (SB) and normal burst (NB). Hence, the custom filter 175A is less vulnerable to adjacent interference and also passes the desired FB signal, even if the frequency error is relatively large. In the embodiment described above, the custom filter 175A is an asymmetric complex filter, which is more expensive to implement in comparison with a symmetric real filter. A preferable alternative filter 175A is a symmetric, real-valued narrow-band custom filter wherein its pass-band is shifted by biasing the synthesizer frequency away from the nominal value. In this way, the resulting filter is centered on the biased synthesizer frequency and thus the asymmetric filter described above can be implemented as a symmetric real filter plus a synthesizer frequency bias.

More specifically, during initial acquisition when frequency offset can be relatively large, an FB search custom filter 175A is switched into use, or otherwise activated. Additionally, the local frequency generated from DCXO 130 is intentionally biased away from the nominal value on which the mobile station is operating. The bias value and the bias direction are pre-defined and directly related with the design of the FB custom filter 175A. Once frequency synchronization is achieved, channelization filter 175B is switched into use during subsequent FB searches and the frequency bias is not applied. During reception of synchronization burst (SB) and normal burst (NB), the channelization filter 175B is switched into use, or otherwise activated, as filter 175. In one embodiment, when FB search filter 175A is active, channelization filter 175B is inactive, and vice versa. One FB search filter 175A that may be employed as filter 175 is a combination of two cascaded filters working at different sampling rates. FB search filter 175A has a bandwidth that is narrower than the bandwidth of channelization filter 175B. Channelization filter 175B is a low pass filter exhibiting a bandwidth wider than narrowband FB filter 175A, namely a bandwidth appropriate for normal reception of GSM voice and data signals.

The I and Q outputs of filter 175 are coupled to RF receiver interface 180. It is noted that the I and Q outputs of filter 175 are also outputs of transceiver subsystem 115. RF receiver interface 180 includes an FB circular buffer 182 which is configured to store I and Q samples that are supplied thereto by receiver 120.

The I and Q outputs of RF receiver interface 180 are coupled to frequency burst (FB) search hardware 185 which determines the location of the frequency burst (FB) when receiver 120 is first set to a particular frequency channel. FB search hardware 185 is located in baseband subsystem 190. The I and Q outputs of RF receiver interface 180 are also coupled to a digital signal processor (DSP) 200 which executes a frequency offset estimation process 205 to adjust the frequency of receiver 120 when a search for the FB is conducted.

FB search hardware 185 includes an autocorrelation (ACOR) computation unit 195 to which the I and Q outputs of receiver interface 180 are coupled. Any DC offset which the I and Q signals may contain can be removed in ACOR unit 195 based on the value in DC offset register 246 as programmed by MCU 125. One purpose of FB search hardware 185 is to distinguish between a desired FB signal on a particular channel from an interferer. On the GSM/GPRS broadcast control channel (BCCH), each FB lasts for one time slot while other types of bursts generated from quasi-random data are transmitted prior to and after the FB. Thus, a relatively sharp or relatively high peak appears in the magnitude of the ACOR coefficients of the received signal when it reaches the end of an FB. Once the position of this substantial ACOR peak is determined, coarse timing of the FB is achieved. An interferer may be a so-called "continuous wave" (CW) signal or other similar undesired narrowband signal or carrier associated with existing analog cellular systems or other digital systems. It is noted that for a CW signal or other similar undesired narrowband signal, that type of signal persists much longer in time than an FB signal which is a burst. By observing the profile of ACOR values of the received signal, the disclosed FB search hardware 190 can distinguish between the desired GSM signal and a narrowband interferer.

FB search hardware 185 includes an FB location state machine section 210 that performs profile matching to find the sharp peak in the ACOR function values i.e. the ACOR coefficients, mentioned above. FB location state machine section 210 includes an FB location state machine with CW detection 215 and an FB location state machine without CW detection 220 to determine the location of the FB from information provided thereto by ACOR computation unit 195. Once the FB is located, an automatic frequency correction (AFC) unit 225 of a synchronization state machine 230 in MCU 125 uses this result to adjust the DCXO programming value. This indirectly changes the carrier frequency of RF receiver 115 by making adjustments to a 26 MHz clock associated with frequency synthesizer 140. The disclosed methodology can accommodate relatively large carrier frequency offsets. In practice, this means that less expensive crystals 135 may be employed as frequency references in system 100. Such crystals tend to have wider tolerance and thus be more prone to undesired offsets.

Synchronization state machine 230 of MCU 125 includes an FB scheduling unit 235 which controls the timing and duration of the search window during which receiver 120 is activated to listen for FB on the desired channel. As will be discussed in more detail below, it is noted that DSP 200 and MCU 125 are not always activated. Rather, to reduce digital noise that could impact reception, when receiver 120 is active, DSP 200 and MCU 125 are inactive. Then later, after receiver 120 is deactivated, DSP 200 and MCU 125 can be activated. This is a type of time domain isolation (TDI) wherein RF activities are generally isolated in time from digital processing activities. Time domain isolation is described in the copending U.S. patent application entitled "Highly Integrated Radio-Frequency Apparatus and Associated Methods", inventors Navdeep S. Sooch and G. Tyson Tuttle, Ser. No. 10/426,042 filed Apr. 29, 2003, the disclosure of which is incorporated herein by reference in its entirety. A time domain isolation window (TDI window) is a period of time during which RF activity is isolated from digital activity that is performed at other times. A system timer unit (STU) 240 is coupled to MCU 125 to receive system timing instructions therefrom. In one embodiment STU 240 is always on. STU 240 includes a power down (POWER DOWN) output 240A which is coupled to transceiver 115 so that receiver 120 can be activated or inactivated. In one embodiment, STU 240 generates a POWER DOWN signal which controls when the RF circuitry is active and inactive. It is noted that the RF circuitry 115 can include not only receiver circuitry, but also transmitter circuitry. The POWER DOWN signal can be used to control the activation and inactivation of both receiver and transmitter circuitry. STU 240 also includes an FB_Search_Enable output 240B which is coupled to FB search hardware 185 so that hardware 185 can be instructed that an FB search window is open and that an FB search is to be commenced. In one embodiment, receiver 120 is active during the search window.

More detail is now provided with respect to the subsystems and other components of wireless communication system 100. As mentioned above, FB search hardware 185 includes an autocorrelation (ACOR) computation unit 195 that determines the autocorrelation results or values with respect to the signal received by receiver 120 in real time when receiver 120 is active and DSP 200 and MCU 125 are inactive. A sharp or substantial peak in the magnitude of the ACOR results or values of the received signal indicates that an FB has been received. More specifically, this sharp peak corresponds to the end of an FB. Such a peak is substantial relative to the ACOR values adjacent the peak, namely before and after the peak. Once the position of this peak is determined, coarse timing of the FB is accomplished. The ACOR results, i.e. the ACOR Ratios or values, can be determined by using either Equation 1 or Equation 2 below. In one embodiment, ACOR computation unit 195 calculates the magnitude of the autocorrelation value by using 144 baud-rate symbols in a sliding window. A delay lag of 8 symbols is used and the sliding window advances 9 symbols at a time. More particularly, nine symbols are averaged and every nine symbols the oldest of the nine symbol averages in a collection of sixteen is replaced by the newest average, and the ACOR of the resulting 144 bits is performed as indicated in Equation 2 below. In one embodiment, a post-normalized ACOR value, $Ratio_{post}[i]$, is determined according to Equation 1:

$$Ratio_{post}[i] = \frac{\left|\sum_{k=i\times 9}^{k=i\times 9+143} y[k] \cdot y^*[k-8]\right|^2}{\left|\sum_{k=i\times 9-4}^{k=i\times 9+139} |y[k]|^2\right|^2} \quad \text{Equation 1}$$

wherein 8 is the autocorrelation delay of 8 GSM symbols; wherein $Ratio_{post}[i]$ is computed at ⅑ of the GSM symbol rate, the symbol index "k" being advanced by 9 each time. The summation for the numerator is performed in a time window k=[i*9, i*9+143] which contains 144 symbols. The summation for the denominator is performed in a time window k=[i*9−4, i*9+139] which also contains 144 symbols. The term, y[k], is the baud-rate sampled received signal.

In one embodiment, to improve the statistics of ACOR value in a fading environment, a pre-normalized ACOR value, Ratio[i], is determined according to Equation 2:

$$Ratio[i] = \left|\frac{1}{144} \sum_{k=i\times 9}^{k=i\times 9+143} \frac{y[k] \cdot y^*[k-8]}{|y[k] \cdot y[k-8]|}\right|^2 \quad \text{Equation 2}$$

The term, y[k], is again the baud-rate sampled received signal. In this particular embodiment, the FB search conducted by the ACOR computation unit 195 determines the autocorrelation value at a fixed time delay of 8 symbols according to this equation. Time delays less than or greater than 8 symbols can also produce acceptable results provided the time delay is not so large or small that performance is substantially degraded. When the time delay is set to 8 symbols to perform the calculation indicated by Equation 2 for the pre-normalized ACOR value, Ratio[i], 9 symbols are averaged. For every 9 symbols, the oldest of the 9 symbol averages in a collection of 16 is replaced by the newest average and the ACOR value for the resulting 144 bits is determined. Thus the computation is performed every 9 samples. The initial average is over 9 samples and thus there are 8 clocks to perform the average. In one embodiment, ACOR computation unit 195 may employ a look-up table (not shown) for the pre-normalization computation, rather than applying a divide operation.

The values, Ratio[i], are supplied to the frequency burst FB location state machine section 210 so that state machine section 210 can determine if an FB has been found as well as its location. Location state machine section 210 includes an FB location state machine with CW (i.e. narrowband signal) detection 215 that determines if a signal is an FB or a CW (narrowband) signal. Location state machine section 210 also includes an FB location state machine 220 without CW detection. FB search hardware 185 is an internally programmable device which acts as a peripheral of MCU 125. MCU 125 programs the FB search hardware with DC offset register 246 for its ACOR computation unit 195, and programs it with mode control register 244 to select between state machine 215 and state machine 220, and programs it with parameter register 242 for the selected state machine. It is thus seen that the MCU assists the ACOR computation unit in locating FB by these actions. Ultimately MCU 125 provides corrective information to DCXO 130 thus indirectly enabling the operating frequency of receiver 120 to be corrected.

Figure 2:
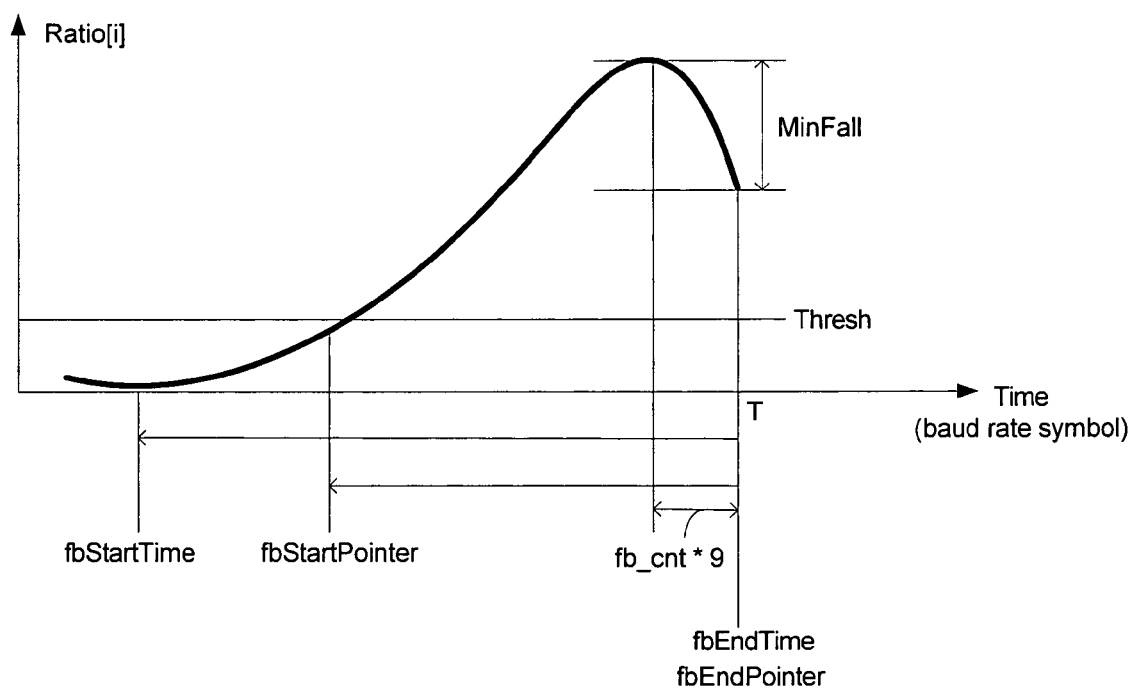
FIG. 2 is a graph of a typical autocorrelation (ACOR) ratio profile when an FB is detected.

FIG. 2 is a graphical representation of a typical ACOR ratio profile when an FB is detected. It is noted that this depiction is not necessarily drawn to scale and that ACOR profiles having different shapes may produce acceptable results as well. The ACOR value, Ratio[i], is shown on the y axis and time T (baud rate symbol units) is shown on the x axis. The following terms are defined with reference to FIG. 2. If an FB is detected at time T, then fbEndTime (the FB end time) is provided by STU 240, an fbEndPointer (an FB end pointer) is provided by RF RX interface 180 and an fb_cnt (FB count) is provided by FB search hardware 185. fb_cnt*9 refers to the number of baud-rate symbols from Ratio peak to the end of FB detection. MCU 125 determines an fbStartTime (an FB start time) to approximately synchronize with the time base of the transmitting base station. The fbStartPointer and fbEndPointer are pointers for FB circular buffer 182. DSP 200 determines an fbStartPointer for its frequency offset estimation task. FIG. 2 clearly shows a substantial peak in the autocorrelation function which is the profile associated with the occurrence of an FB.

Figure 3:
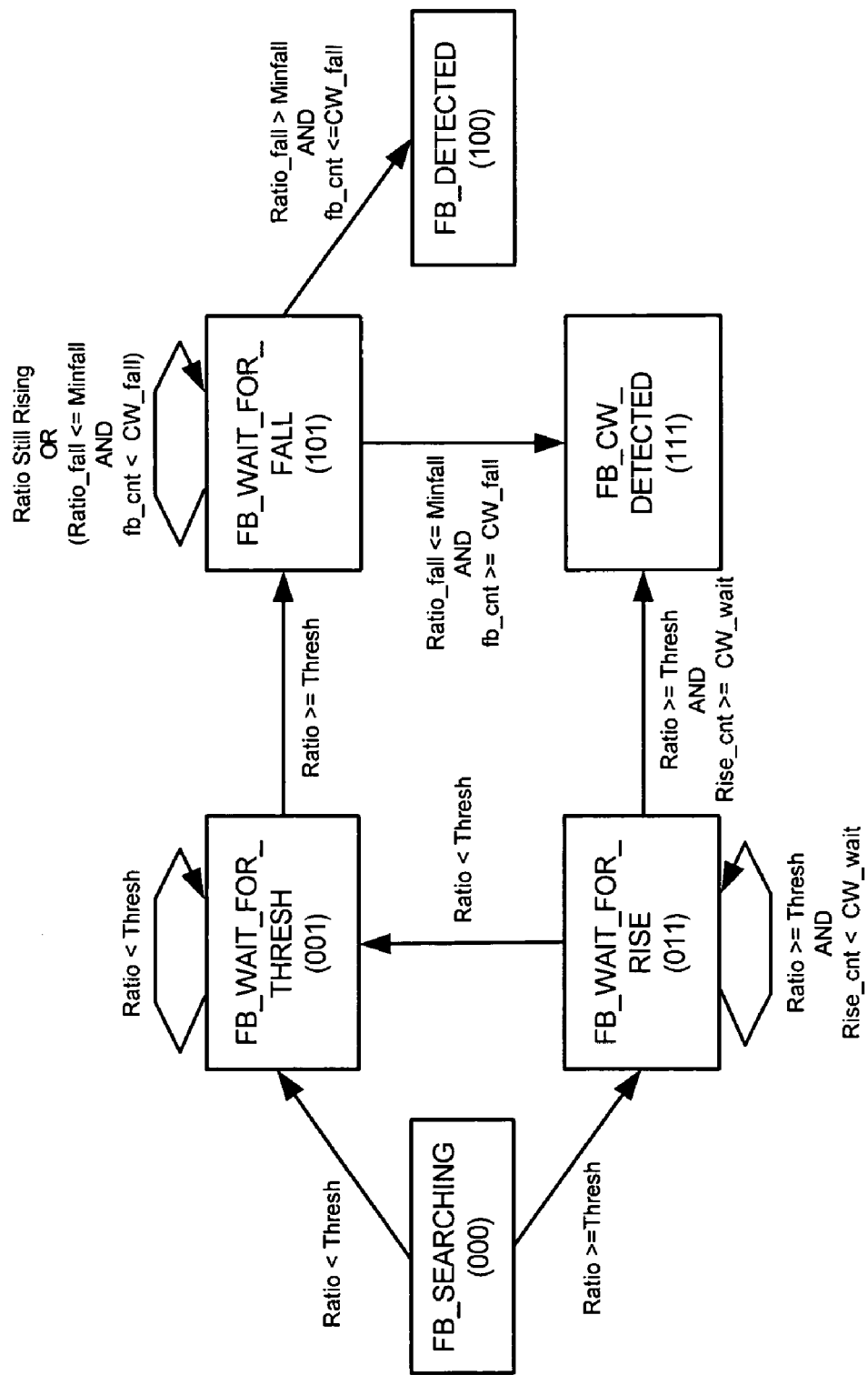
FIG. 3 is an illustrative state diagram of an FB location state machine of the FB search hardware with CW (narrowband interferer) detection capability.
Figure 4:
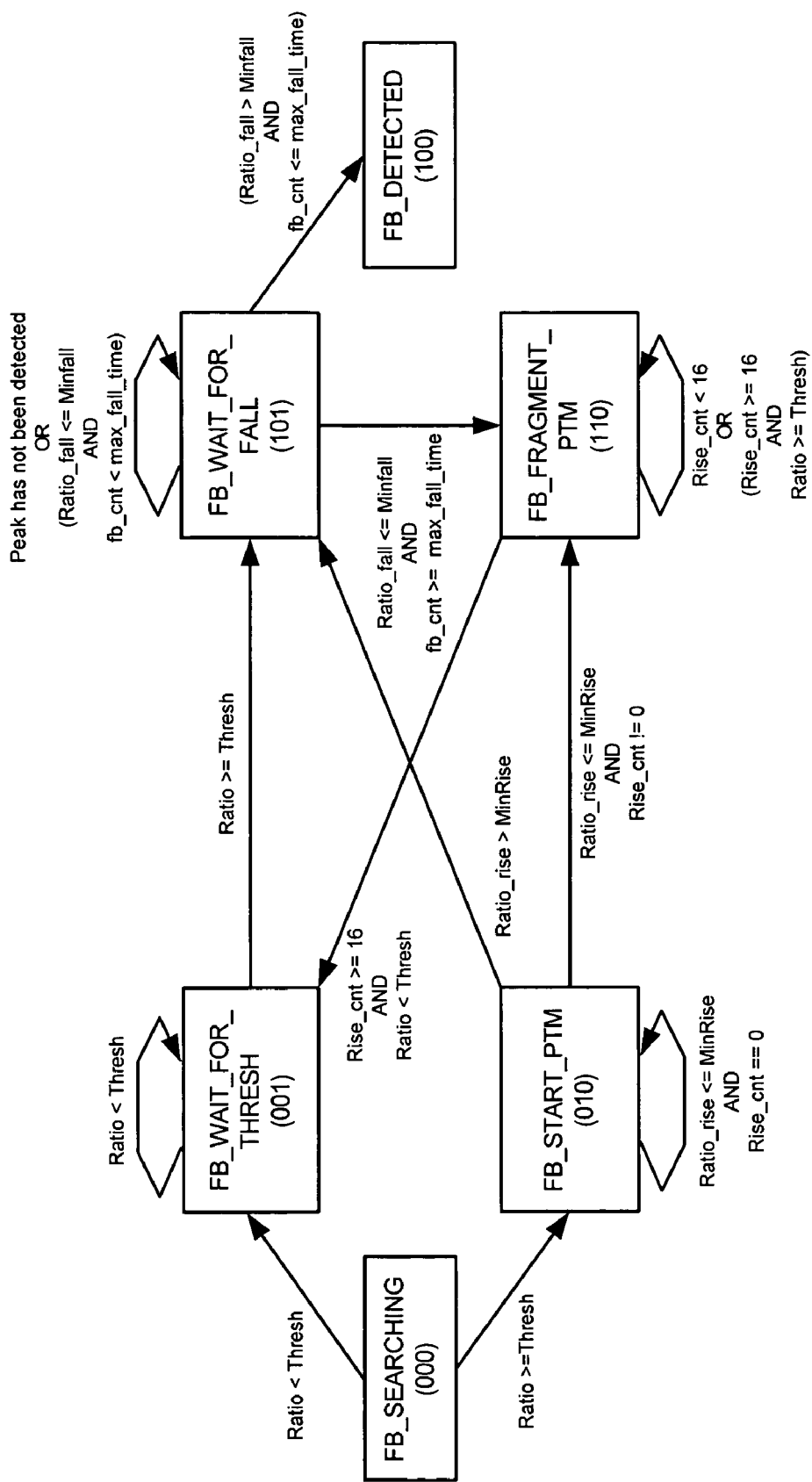
FIG. 4 is an illustrative state diagram of an FB location state machine of the FB search hardware without CW (narrowband interferer) detection capability.

FIG. 3 is a state diagram of the FB location state machine 215 with CW detection, namely narrowband interferer detection. State machine 215 is capable of distinguishing a narrowband interferer from an FB. Before discussing the operation of FB location state machine 215, parameters employed by state machine 215 are first presented. Thresh, CW_wait, CW_fall and Minfall are parameters programmed by the MCU 125 before FB search is commenced. Ratio is the autocorrelation ratio information provided by ACOR computation unit 195. A sequence of Ratios or values is provided to FB location state machine 210 as samples that are received and processed. CW_wait is the number of wait counts needed to claim CW detection in a FB WAIT_FOR_RISE state (011). It is noted that the names selected for the various states in the state diagrams of FIGS. 3 and 4 are representative. These names should not be taking as being limiting and other names may be used as well to label these states. Wait counts are measured in number of Ratio [i], which is computed every 9 symbols. CW_fall is the number of wait counts needed after a Ratio peak occurs to be able to claim CW detection in a FB_WAIT_FOR_FALL state (101). With respect to the parameter Minfall, it is noted that in the WAIT_FOR_FALL state (101), after a Ratio peak has occurred, within CW_fall count, Ratio must fall for more than the "MinFall" amount in order to claim that a GSM FB has been detected. Otherwise, as seen in FIG. 3, the CW signal is reported as being detected. Parameters Thresh, CW_wait, CW_fall and Minfall are programmable by MCU 125 and are provided to FB location state machine 215 via parameter register 242. Thresh is the value which the Ratio must equal or exceed to indicate that the FB has been located. CW_wait is the number of wait counts needed to claim CW detection in a FB_WAIT_FOR_RISE state. Rise_cnt is an internal counter which counts the number of Ratio[i] occurred while the state machine is in the FB_WAIT_FOR_RISE state. fb_cnt counts the number of Ratio[i] from the time when the ratio peak occurs to the time when an FB is detected. In one embodiment, FB location state machine without CW detection 220 is used, and then if an interference situation is encountered, FB location state machine 215 may used to locate the FB.

As seen in the state diagram of FIG. 3, FB location state machine with CW detection 215 commences searching for FB at state 000. If the ACOR ratio (i.e. Ratio) is less than the threshold, Thresh, then process flow continues to the state 001 at which the state machine waits for the Ratio to exceed Thresh. State 001 is the FB_WAIT_FOR_THRESH state, a term selected for convenience. When Ratio finally exceeds or is equal to Thresh, then flow continues to state 101, namely the FB_WAIT_FOR_FALL state (101). Ratio_fall is the difference between the ACOR ratio peak and the current ACOR ratio. Minfall is defined in the following manner. In the FB_WAIT_FOR_FALL state (101), after the ratio peak occurs, within a CW_fall count, Ratio must decrease more than the Minfall amount in order to claim that an FB is detected. CW_fall is the number of wait counts needed after a ratio peak occurs to be able to claim CW detection in a FB_WAIT_FOR_FALL state (101). After the Ratio peak has occurred, and then when Ratio_fall>Minfall and fb_cnt<=CW_fall, then flow continues to state 100, namely the FB_DETECTED state. When state 100 is reached, then FB has been detected.

Returning to state 101 of FIG. 3, if Ratio_fall<=MinFall and fb_cnt>=CW_fall, then flow continues to state 111, namely the FB_CW_DETECTED state. When state 111 is reached, then CW has been detected. In other words an interferer and not the desired FB has been detected. Returning to state 000, FB_SEARCHING, if Ratio>=Thresh, then flow continues to state 011, namely the FB_WAIT_FOR_RISE state. If Ratio is then found to be less than Thresh, then flow continues to state 001 and process flow continues as discussed above. However, if at state 011, Ratio>=Thresh and Rise_cnt>=CW_wait then flow continues to state 111 and a CW (narrowband) signal has been detected.

FIG. 4 is a state diagram of the FB location state machine 220 without CW detection, i.e. without narrowband interfering signal detection. While other applications are possible, one application of state machine 220 is for situations when the CW carrier, i.e. narrowband interference, of another system is unlikely to be received and thus there generally is no need to distinguish between GSM's frequency burst (FB) and another system's carrier. State machine 220 persistently searches for FB when an FB search window is opened and this machine is selected.

The parameters Thresh, Minrise, Max_Fall_Time, and MinFall are programmable by MCU 125. For those circumstances when CW detection is not required, FB location state machine 220 commences searching for FB at state 000 of FIG. 4. If the Ratio<Thresh, then flow continues to state 001, namely the FB_WAIT_FOR_THRESH state where the state machine waits until Ratio exceeds or equals Thresh. When the Ratio is found to exceed or equal Thresh, then flow continues to state 101, namely the FB_WAIT_FOR_FALL state. In state 101, after a Ratio peak has occurred and within the Max_Fall_Time count, Ratio has to fall for no less than the Minfall amount in order to claim that a GSM FB has been detected. Max_fall_time refers to the number of wait counts after a Ratio peak has occurred before going to FB_FRAGMENT_PTM STATE (110) from the FB_WAIT_FOR_FALL state (101) if Ratio has not fallen for more than the MinFall amount. If Ratio_fall>Minfall and fb_cnt<=max_fall_time, then an FB is detected and flow continues to state (100), namely the FB_DETECTED state. Otherwise, flow continues to the FB_FRAGMENT PTM state (110). Rise_cnt is an internal counter, which counts the number of Ratio[i] occurred while the state machine is in the FB_START_PTM state (010) and the FB_FRAGMENT_PTM state (110). Rise_cnt is reset to 0 when the state machine enters the FB_START_PTM state (110). The state machine 220 will stay in the FB_FRAGMENT_PTM state (110) until Rise_cnt reaches 15, and afterwards waits until Ratio drops below Thresh. After Rise_cnt reaches 15, once the Ratio falls below Thresh, the state machine returns from the FB_FRAGMENT_PTM state (110) to the FB_WAIT_FOR_THRESH state (001).

Returning to the FB_SEARCHING state 000 of FIG. 4, if Ratio>=Thresh, then flow continues to state 010, namely the FB_START_PTM state (010). The FB_START_PTM state 010 uses the MinRise parameter to determine if the ACOR Ratio rises sufficiently fast to be an FB candidate. Ratio_rise is the difference between the current Ratio and the Ratio when the state machine flows to FB_START_PTM state (010). Ratio_rise provides an indication of the speed at which the Ratio value is increasing. If Ratio_Rise>MinRise then process flow continues to FB_WAIT_FOR_FALL 101 wherein processing continues as described above. However, if Ratio_rise<=MinRise and Rise_cnt=0, the state machine stays at FB_START_PTM state (010) thus waiting for one more slow-rising or decreasing Ratio[i]. If the next Ratio does not rise high enough or a decreasing Ratio is found, then flow proceeds to the FB_FRAGMENT_PTM state (110). MCU 125 can instruct either FB location state machine 215 or 220 to be selected by setting an appropriate configuration bit via mode control register 244.

Returning to FIG. 1, once an FB is located by either FB location state machine 215 or 220, frequency offset estimation is commenced. This information is used to change the frequency on which DXCO 130 is operating. As described above, automatic frequency control (AFC) unit 225 in MCU 125 indirectly informs DXCO 130 of the frequency to which DCXO 130 should be tuned so that the offset is ultimately corrected. It is noted that in one particular embodiment, the DCXO operates at approximately 26 MHz whereas the radio channels exist between approximately 850 MHz and approximately 1.9 GHz. The received tone or signal is checked against the expected tone of the FB and, based upon the difference between the two, the DCXO frequency is modified to adjust the 26 MHz locally generated clock signal to a clock recovered from the received tone offset from the expected tone. In actual practice the AFC line represents additional circuitry to assist in retrieving the offset from DSP 200 and communicating the value that the tone is off to the DCXO. Once the offset correction is applied, the local carrier frequency of receiver 120 is tuned to the carrier frequency of the GSM base station. In actual practice it may take several FBs to get sufficiently close to read the SB depending upon the accuracy of crystal 135 and other factors such as the nonlinear characteristics of the DCXO.

Once an FB is detected, DSP 200 executes a frequency offset estimation process 205 to estimate the current frequency offset of the received signal. Frequency offset estimation process 205 includes a filter bank process 205A and a single filter process 205B. When the FB is initially acquired, the frequency offset can be relatively large and in this case DSP 200 employs the filter bank of filter bank process 205A. For later received FBs after initial offset correction, the single filter of single filter process 205B may be used. The operation of filter bank 205A and filter 205B by DSP 200 are examples of noise producing digital processes that could potentially interfere with signal reception if they had been allowed to occur while RF circuitry 115 was activated. However in an embodiment discussed above, noise producing digital processes such as those carried out by MCU 125 and DSP 200 were inactivated during RF activity.

Figure 5:
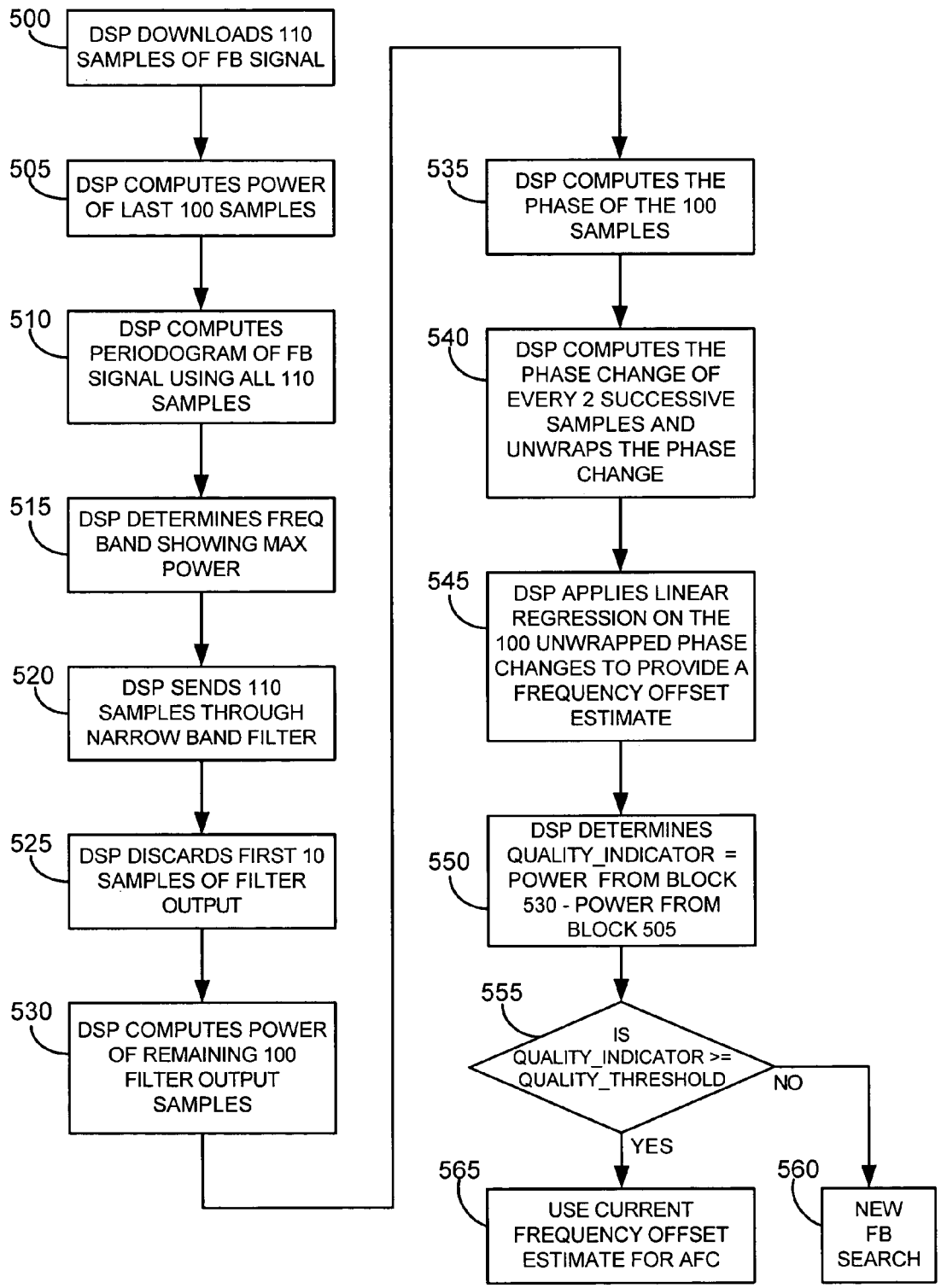
FIG. 5 is an illustrative flowchart illustrating the operation of a filter bank of the frequency offset estimation process employed by the disclosed system.

FIG. 5 is a flowchart illustrating the operation of filter bank process 205A that is used during initial acquisition when the offset can be relatively large. Process 205A is executed while DSP 200 and MCU 125 are active. This is an example of one signal processing activity that may generate digital noise. In one embodiment, during initial FB acquisition, DSP 200 downloads 110 samples of the FB signal from circular buffer 182 of RF receiver interface 180 as per block 500. The I and Q signals from RF receiver interface 180 are supplied to DSP 200 for this purpose. DSP 200 then computes power (in dB) of the last 100 samples downloaded as per block 505. After power computation, DSP 200 determines the periodogram of the FB signal using the full 110 sample group as per block 510. DSP 200 then determines the frequency band showing maximum power in the periodogram as per block 515. Subsequently in block 520, DSP 200 sends the full sample set, namely 110 samples in this particular example, through a narrowband filter which covers the frequency band exhibiting maximum power as determined in block 515. In one embodiment the effective bandwidth of this filter is approximately 20 KHz. DSP 200 then discards the first 10 samples of the narrowband filter output as per block 525. DSP 200 then computes the power (in dB) of the remaining 100 filter output samples as per block 530 and computes phase of the remaining 100 filter output samples as per block 535. Then, as per step 540, DSP 200 computes the phase change of every two successive samples and unwraps the phase change. DSP 200 then applies linear regression to the 100 unwrapped phase changes to provide a frequency offset estimate as per block 545. Then as per block 550, DSP 200 determines a quality indicator, QUALITY_INDICATOR, of how accurate the frequency offset estimate is by subtracting the power determined in block 530 from the power determined in block 505. A quality test is then conducted by the MCU as per decision block 555. More specifically, if the QUALITY_INDICATOR is not >= a predetermined QUALITY_THRESHOLD, then the frequency offset estimate is discarded and a new FB search is conducted as per block 560. However, if the QUALITY_INDICATOR is >= to the predetermined QUALITY_THRESHOLD, then the current frequency offset estimate is used to correct the operating frequency of the system as per block 560. More specifically, the frequency offset estimate is provided to MCU 125 in which AFC unit 225 then instructs DCXO 130 to change its frequency according to a frequency offset correction signal provided on the AFC line coupled to output 225A. It is noted that, in one embodiment, after RF circuitry 115 is inactivated, DSP 200 is activated to determine the frequency offset estimate as described above. At those times when DSP 200 is so activated, receiver 120 is inactivated to reduce the potential effects of noise on the receiver.

Figure 6:
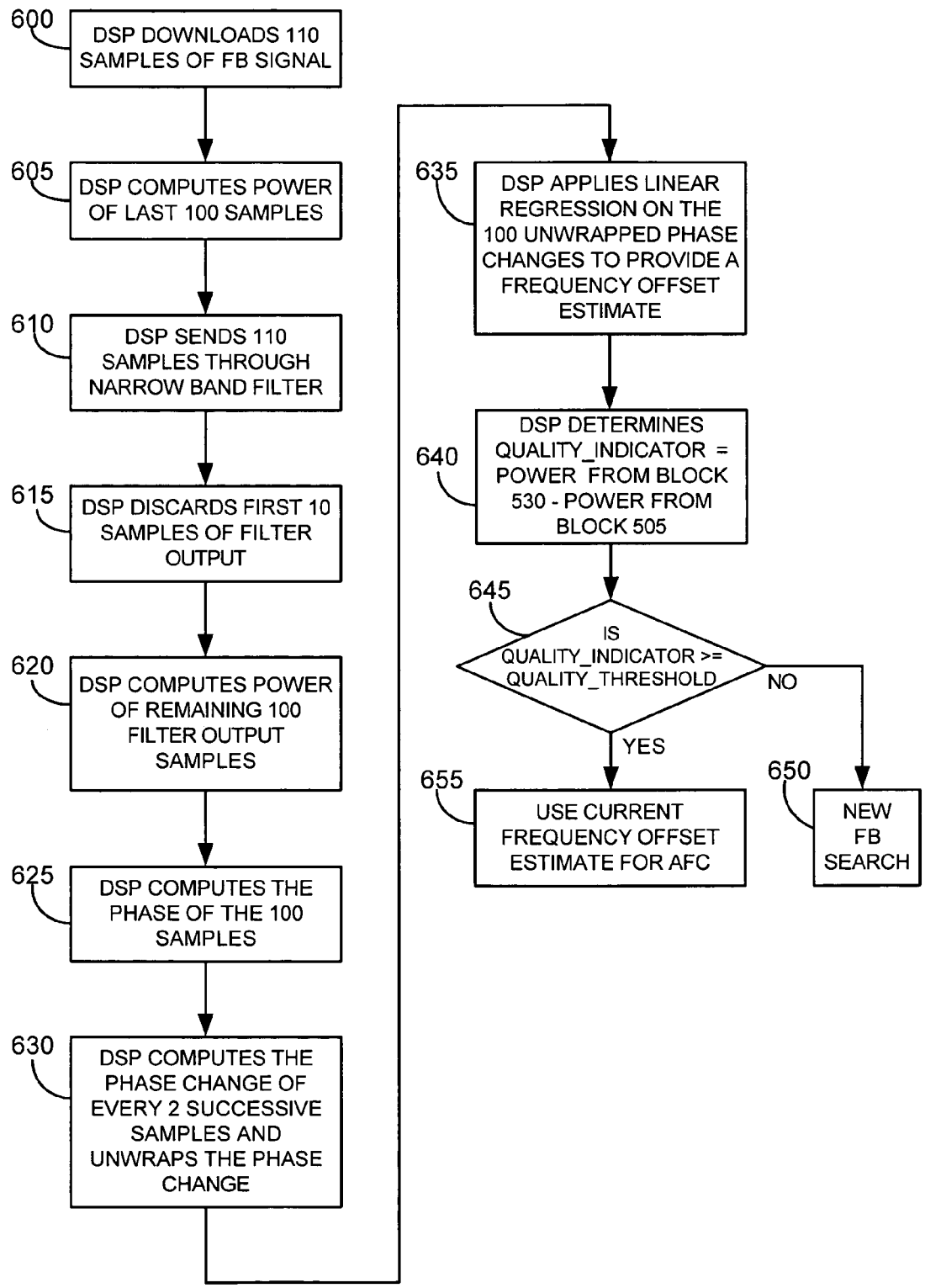
FIG. 6 is an illustrative flowchart illustrating the operation of a single filter of the frequency offset estimation process employed by the disclosed system.

FIG. 6 is a flow chart showing a single filter process 205B that is used by DSP 200 once frequency acquisition is achieved and the offset is smaller than during initial acquisition. In one embodiment, DSP 200 downloads 110 samples of the FB signal from circular buffer 182 of RF receiver interface 180 as per block 600. DSP 200 then computes power (in dB) of the last 100 samples downloaded as per block 605. In this particular embodiment, a periodogram of the FB is not employed. Rather, DSP 200 sends the full sample set of 110 samples through a narrowband filter as per block 610. In this embodiment, the center frequency of the narrowband filter is 67.7 KHz. The bandwidth and shape of the filter is the same as the narrowband filter in the process of FIG. 5. After this narrowband filtration, in block 615 DSP 200 discards the first 10 samples outputted by the single narrowband filter implemented by DSP 200. Then DSP 200 computes the power (in dB) of the remaining 100 filter output samples as per block 620 and computes the phase of the remaining 100 filter output samples as per block 625. DSP 200 now computes the phase change of every two successive samples and unwraps the phase change as per step 630. DSP 200 then applies linear regression to the 100 unwrapped phase changes to provide a frequency offset estimate as per block 635. Then, as per block 640, DSP 200 determines a quality indicator, QUALITY_INDICATOR, of how accurate the frequency offset estimate is by subtracting the power determined in block 620 from the power determined in block 605. A quality test is then conducted in the MCU as per decision block 645. More specifically, if the QUALITY_INDICATOR is not >= to a predetermined QUALITY_THRESHOLD, then the frequency offset estimate is discarded and a new FB search is conducted as per block 650. However, if the QUALITY_INDICATOR is >= to the predetermined QUALITY_THRESHOLD, then the current frequency offset estimate is used to correct the operating frequency of the system as per block 655. More specifically, the frequency offset estimate is provided to MCU 125 in which AFC unit 225 then instructs DCXO 130 to change its frequency according to a frequency offset correction signal provided on the AFC line coupled to output 225A. It is noted that, in one embodiment, after RF circuitry 115 is inactivated, DSP 200 is activated to determine the frequency offset estimate as described above.

Returning to FIG. 1, scheduling of the FB search window is provided by an FB scheduling unit 235 that is implemented as part of the synchronization state machine 230 in MCU 125 in this particular embodiment. The FB search is performed during a search window the timing of which is controlled by MCU 125 through system timer unit (STU) 240 FB scheduling unit 235 of MCU 125 controls the FB search window by setting the time that the FB search is started and stopped via an FB_Search_Enable signal on FB_Search_Enable line 240B of STU 240. STU 240 also controls the times at which receiver 120 is activated and inactivated via a POWER DOWN signal on the STU's POWER DOWN line 240A.

More particularly, the FB search is performed within a search window caused by the STU raising a level sensitive enable signal (the FB_Search_Enable) which is supplied by STU 240 to the FB search hardware (FBSHW) 185. Upon finding an FB or a CW signal, the FBSHW 185 stops itself even before the window is finished. The FBSHW sets an FB_DONE flag as soon as FB or CW is detected. CW here is used in the sense of being not only a continuous wave signal, but other narrowband interfering signals as well. If no FB or CW is detected, the FB_DONE flag is set at the end of the search window. The FB_DONE flag is reset at the beginning of each new FB search window. The FB_DONE flag is sent to STU 240 and to circular buffer 182 (connection not shown). STU 240 can choose to use this flag to end the search window immediately. When an FB is detected, STU 240 uses the rising edge of the FB_DONE flag to capture the time value which is then reported back to MCU 125. In one embodiment, the reported time value refers to the number of quarter bits from the time at which a last instruction issues until the FB_DONE is asserted. Receiver interface 180 then freezes the contents of FB circular buffer 182 such as its write address and stops sending data strobes to the FB search hardware 185. Once FB or CW is detected by the FB search hardware 185, an oldest sample pointer (fbEndPointer) is provided by RF RX interface 180. FB search hardware 185 provides an fb_cnt_value (frequency burst count value) stored in FB status register 222. When the DSP starts its FB related tasks, it computes a read pointer based on fbEndPointer and fb_cnt_value and provides the read pointer to the circular buffer 182 pointing to the starting position of samples that will be used for frequency offset determination.

FB acquisition is performed in a time window also referred to above as the search window during which the RF front end, namely receiver 120 is continuously activated to receive a signal. RF activities such as just described are isolated in time from the baseband digital activities such as those performed by DSP 200. This desirably reduces noise in the receiver. This noise reduction approach is discussed in more detail in the copending patent application entitled "Wireless Communication System With Hardware-Based Frequency Burst Detection", Ser. No. 10/955,569 which is incorporated herein by reference in its entity and which is filed on the same day as this patent application.

Figure 7A:
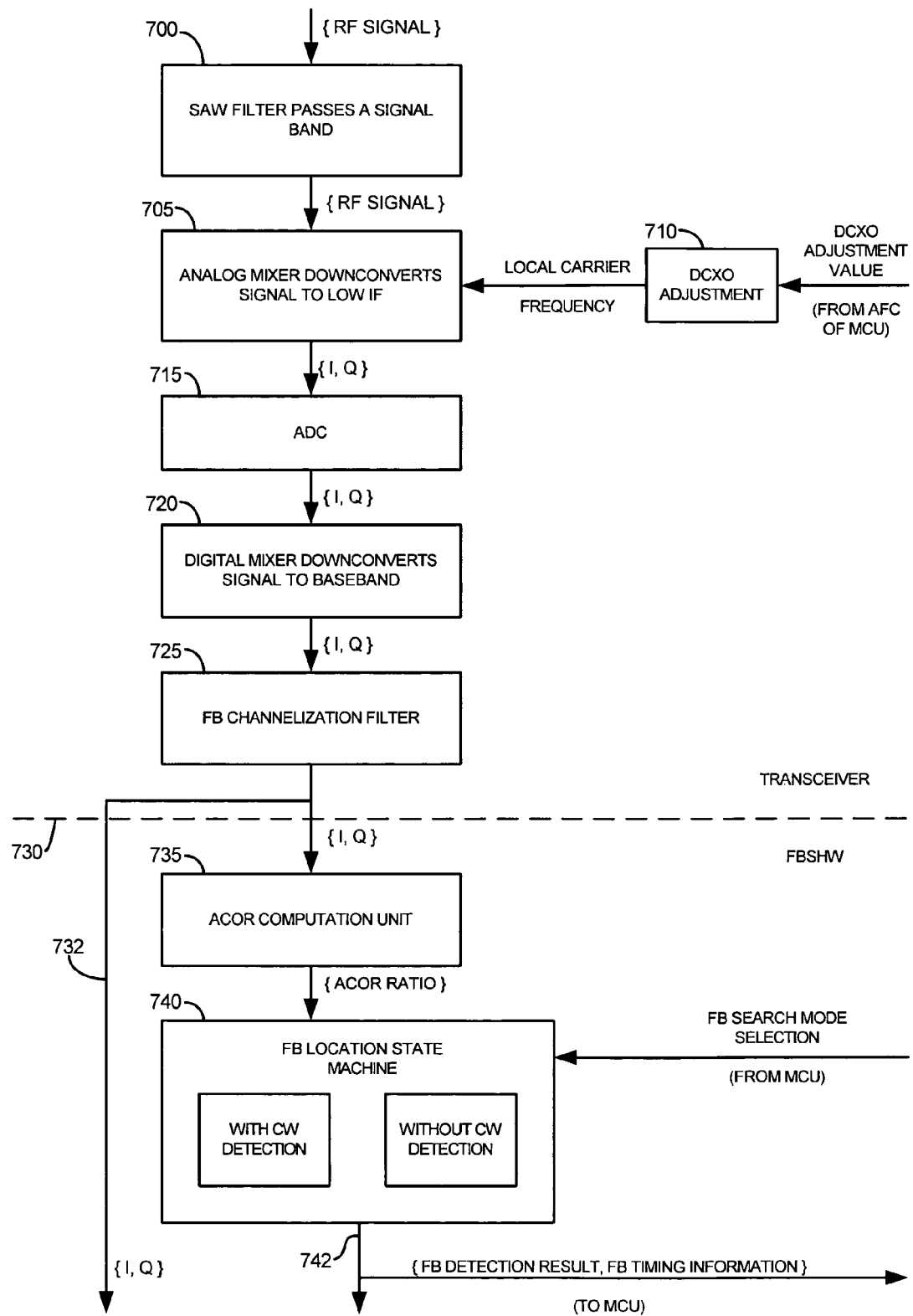
FIG. 7A-7B together form an illustrative flowchart summarizing the operation of the disclosed wireless communication system.
Figure 7B:
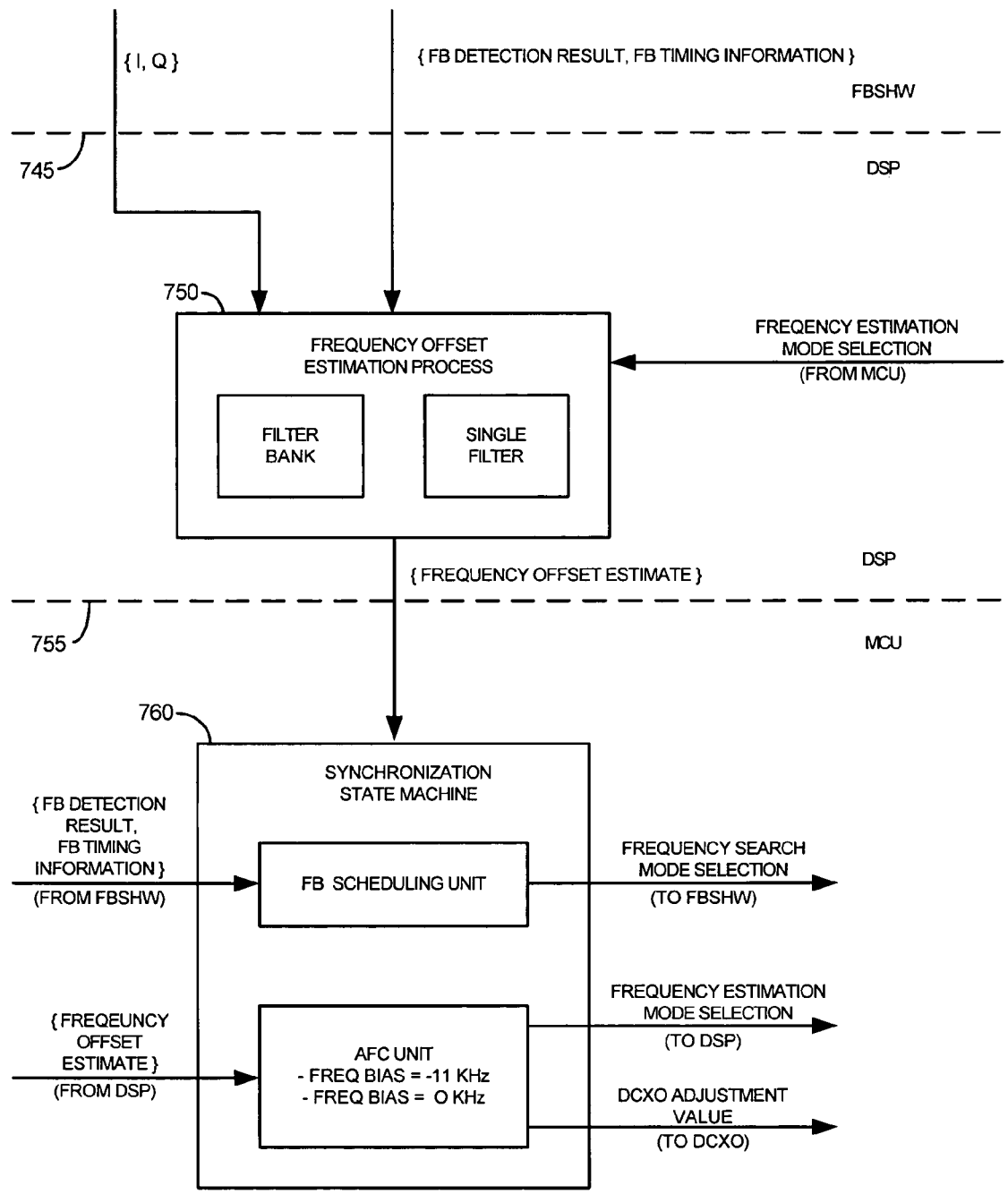

FIGS. 7A and 7B together form a flow chart summarizing the operation of wireless communication system 100. This flow chart is enhanced to show selected signals and subsystems in addition to process flow. Radio frequency (RF) signals are captured by antenna 105 and provided to SAW filter 110. SAW filter 110 selects the desired signal from one of 4 bands, namely GSM 850, E-GSM 900, PCS 1800 and PCS 1900 as per block 700. The RF signal is then down-converted to an intermediate frequency (IF) by analog mixer 150 as per block 705. In one embodiment, DCXO 130 receives a DCXO adjustment value or frequency offset from AFC unit 225 of MCU 125 as per block 710. In actual practice, MCU 125 sends frequency correction information to an MCU peripheral device (not shown) which passes the information when needed to DCXO 130. This value is used to adjust the frequency of the DCXO output which is used as an input to frequency synthesizer 140. In this manner the receive frequency, which is controlled by synthesizer 140, is indirectly adjusted by changing the value provided to the DCXO. The down-converted analog signal is then converted to a digital signal by analog to digital converters 155 and 160 as per block 715 to provide digital I and Q signals. Digital mixer 165 then down-converts the digital I and Q signal components to baseband as per block 720. If this is the initial acquisition of FB for a received signal, then the digital signal is supplied to a narrowband FB filter 175A as per block 725. However, if FB has already been acquired, then the received signal is supplied to narrowband channelization filter 175B. As discussed above, the bandwidth of FB filter 175A is selected to be narrower than the bandwidth of channelization filter 175B. Channelization filter 175B is used to receive signals other than signals received during acquisition of FB, i.e. to signals received during normal communication such as for voice and data. FB filter 175A is used for acquisition of FB and not for normal communication. Dashed line 730 represents a demarcation between RF circuitry activities carried out by transceiver 115 above line 730 and FB search hardware processes and baseband processes which are below line 730. During the RF circuitry activities described above, the RF circuitry is active while digital circuitry such as MCU 125 and DSP 200 are held inactive to reduce noise. It is noted that above line 730, FIG. 7A is a data flow diagram whereas below line 730 some paths are displaced in time, i.e. occur after some amount of time has transpired, as described below. Paths 732 and path 742 are examples of such paths displaced in time from the immediately prior step in the flowchart. In path 732 the I and Q samples are passed to FB circular buffer 182 where they can reside for some amount of time before being passed to frequency estimation process 750 which is shown in FIG. 7B.

The received I and Q samples are provided to ACOR computation unit 195 via the FB circular buffer 182. ACOR computation unit 195 determines the autocorrelation function of the received samples as per block 735. FBSHW 185 and its ACOR unit 195 are active at this time. The resultant sequence of ratios or values, Ratio[i], are supplied to the frequency burst FB location state machine 210 so that state machine 210 can determine if an FB has been found as well as the location of the FB. Location state machine 210 can search for the FB in two different modes, namely a mode with CW detection and a mode without CW detection as per block 740. MCU 125 pre-programs the FB location state machine 210 with an FB search mode selection bit in mode control register 244 to instruct the location state machine to use either the mode with CW detection or the mode without CW detection to locate the FB. The FB detection result is then returned to the MCU with FB timing information after the RF circuitry is deactivated.

In FIG. 7B, which shows the remainder of the flowchart, dashed line 745 is used to provide demarcation between FB search hardware (FBSHW) processes above and digital processes of the DSP and MCU below. It is noted that both the DSP and MCU execute code in the performance of their processes. In one embodiment, after the search window expires or after the FB is located, and after receiver 120 is inactivated, DSP 200 and MCU 125 may be activated to commence digital operations. Since receiver 120 is inactive, it is not impaired by the noise generated when DSP 200 and MCU 125 conduct their digital processing tasks. In one alternative embodiment, when the FBSHW locates the FB it inactivates itself automatically, even before the search window finishes, to conserve power. However, prior to going inactive, the FBSHW passes FB location information to a register where the information is stored for later retrieval by DSP 200 and MCU 125 when they become active. As seen in the flowchart as per block 750, the received I and Q samples are provided via FB circular buffer 182 of RF RX interface 180 to the frequency offset estimation process 205 of DSP 200. The FB detection result and FB timing information are also provided to frequency offset estimation process 205. MCU 125 instructs frequency offset estimation process 205 whether to use a filter bank or a single filter in determining the frequency offset as per block 750. The resultant frequency offset estimate is provided to synchronization state machine 230 of MCU 125. During the above described frequency offset determination processes conducted by DSP 200, both DSP 200 and MCU 125 remain activated.

Dashed line 755 is used to provide demarcation between frequency offset estimation processes conducted by the DSP above and MCU processes below. The FB detection result and FB timing information are provided by the FB search hardware 185 to FB scheduling unit 235 in MCU 125 as per block 760. The FB scheduling unit 235 instructs STU 240 to tell FB search hardware 185 when to process I and Q samples, i.e. when to open and close the search window as per block 760. MCU 125 loads this information into STU 240 which controls FBSHW timing. In one embodiment, MCU 125 is inactive or disabled while FBSHW 185 is processing data. FB scheduling unit 235 also instructs FB hardware 185 regarding the FB search mode selection, namely whether to conduct a search with CW (narrowband signal) detection or without CW (narrowband signal) detection. DSP 200 provides the AFC unit 225 of MCU 125 with a frequency offset estimate of the current FB also as per block 760. AFC unit 225 instructs DSP 200 whether to use a filter bank 205A mode or single filter 205B mode. In other words, the DSP is provided with a frequency estimation mode selection by AFC unit 225. AFC unit 225 also provides a DCXO adjustment value to DCXO 130 to correct the frequencies at which synthesizer 140, and ultimately receiver 120, are operating. During the times when the above-described digital activities of MCU 125 and DSP 200 are being conducted, the RF circuitry is inactive to save power. It is noted that the RF circuitry can be effectively inactive if it is powered up but signals received by the RF circuitry are ignored.

A wireless communication system is thus provided that detects a frequency burst (FB) through analysis of the autocorrelation function of received signals. The system can accommodate the relatively large frequency offsets that are associated with less expensive reference frequency crystals. The system employs a multi-mode filter that is utilized as described above. In one embodiment, the FB filter is employed until an FB is located and then, once the FB is located, the channelization filter is employed to receive signals.

Modifications and alternative embodiments of this invention will be apparent to those skilled in the art in view of this description of the invention. Accordingly, this description teaches those skilled in the art the manner of carrying out the invention and is intended to be construed as illustrative only. While GSM embodiments have been described, those skilled in the art will appreciate that the methods taught herein can be applied to other systems as well. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of acquiring a radio frequency burst (FB) signal in a wireless communication device, comprising: receiving at a receiver a signal thus providing a received signal; determining at a baseband section autocorrelation function values of the received signal; determining whether the autocorrelation function values of the received signal exhibit a substantial peak; designating the received signal as a frequency burst (FB) signal when the autocorrelation function values thereof exhibit a substantial peak; filtering the received signal with an FB filter until the received signal is designated as an FB signal, and alternatively, filtering the received signal with a channelization filter if an FB signal has already been designated; and applying a frequency bias to the received signal prior to a FB designation and removing the frequency bias once the FB has been designated, wherein determining the autocorrelation function values of the received signal is performed by determining post-normalized autocorrelation values using a predetermined delay lag combined with a predetermined plurality of symbols.

2. The method of claim 1 further including controlling the operating frequency of the wireless communication device with a digitally compensated crystal oscillator used as a time base, wherein the autocorrelation values of the received signal are determined as a function of a received baud-rate sample signal.

3. The method of claim 1 wherein determining the autocorrelation function values of the received signal is performed by determining pre-normalized autocorrelation function values.

4. The method of claim 1 wherein determining the autocorrelation function values of the received signal is performed by determining pre-normalized autocorrelation values, Ratio[i], given by:

$$\text{Ratio}[i] = \left| \frac{1}{144} \sum_{k=i\times 9}^{k=i\times 9+143} \frac{y[k] \cdot y^*[k-8]}{|y[k] \cdot y[k-8]|} \right|^2$$

wherein y[k] is a received baud-rate sample signal.

5. The method of claim 1 wherein determining the autocorrelation function values of the received signal is performed by determining post-normalized autocorrelation function values.

6. The method of claim 1 wherein determining the autocorrelation function values of the received signal is performed by determining the post-normalized autocorrelation values, Ratio[i], given by:

$$Ratio_{post}[i] = \frac{\left|\sum_{k=i\times 9}^{k=i\times 9+143} y[k] \cdot y^*[k-8]\right|^2}{\left|\sum_{k=i\times 9-4}^{k=i\times 9+139} |y[k]|^2\right|^2}$$

wherein y[k] is a received baud-rate sample signal.

7. The method of claim 1 further including removing a DC offset from the received signal before determining the autocorrelation function values of the received signal.

8. The method of claim 1 wherein determining the autocorrelation function values of the received signal is performed by determining post-normalized autocorrelation values using a delay lag of 8 symbols with a sliding scale of 9 symbols.

9. The method of claim 8 wherein determining post-normalized autocorrelation includes an average of the sliding scale of 9 symbols wherein an oldest of the sliding scale of 9 symbols is replaced forming a new average of the sliding scale of 9 symbols.

10. The method of claim 1 wherein determining the autocorrelation function values of the received signal is performed by determining post-normalized autocorrelation values using a predetermined delay lag combined with an average of 9 symbols.

11. A method of acquiring a radio frequency burst (FB) signal in a wireless communication device, comprising:

receiving at a receiver a signal thus providing a received signal and applying a frequency bias to the received signal when an FB has not yet been designated and removing the frequency bias once the FB has been designated;

determining at a baseband section autocorrelation function values of the received signal;

designating the received signal as an FB signal wherein said autocorrelation function values thereof exhibit a substantial peak; and filtering the received signal with an FB filter until the received signal is designated as an FB signal, and alternatively, filtering the received signal with a channelization filter if an FB signal has already been designated, wherein determining the autocorrelation function values of the received signal is performed by determining post-normalized autocorrelation values using a predetermined delay lag combined with a predetermined plurality of symbols.

12. The method of claim 11 wherein the FB filter is a narrowband filter exhibiting a bandwidth less than the bandwidth of the channelization filter.

13. The method of claim 11 further including controlling the operating frequency of the wireless communication device with a digitally compensated crystal oscillator used as a time base, wherein the autocorrelation values of the received signal are determined as a function of a received baud-rate sample signal.

14. The method of claim 11 further including determining the autocorrelation function values of the received signal by determining pre-normalized autocorrelation function values.

15. The method of claim 11 further including determining the autocorrelation function values of the received signal by determining pre-normalized autocorrelation values, Ratio[i], given by:

$$Ratio[i] = \left|\frac{1}{144} \sum_{k=i\times 9}^{k=i\times 9+143} \frac{y[k] \cdot y^*[k-8]}{|y[k] \cdot y[k-8]|}\right|^2$$

wherein y[k] is a received baud-rate sample signal.

16. The method of claim 11 further including determining the autocorrelation function values of the received signal by determining post-normalized autocorrelation function values.

17. The method of claim 11 further including determining the autocorrelation function values of the received signal by determining post-normalized autocorrelation values, Ratio[i], given by:

$$Ratio_{post}[i] = \frac{\left|\sum_{k=i\times 9}^{k=i\times 9+143} y[k] \cdot y^*[k-8]\right|^2}{\left|\sum_{k=i\times 9-4}^{k=i\times 9+139} |y[k]|^2\right|^2}$$

wherein y[k] is a received baud-rate sample signal.

18. The method of claim 11 further including removing a DC offset from the received signal before determining the autocorrelation values of the received signal.

19. A wireless communication system comprising:

a receiver that provides a received signal and applies a frequency bias to the received signal when a frequency burst (FB) has not yet been designated and removes the frequency bias once the FB has been designated; a FB filter that filters the received signal when an FB has not yet been designated for the received signal;

a channelization filter that filters the received signal after an FB has been designated for the received signal;

a baseband section, coupled to the receiver, that determines autocorrelation function values of the received signal;

determines if the autocorrelation function values of the received signal exhibit a substantial peak;

designates the received signal as a FB signal if the autocorrelation function values thereof exhibit a substantial peak, wherein determining the autocorrelation function values of the received signal is performed by determining post-normalized autocorrelation values using a predetermined delay lag combined with a predetermined plurality of symbols.

20. The system of claim 19 wherein the receiver includes a digitally compensated crystal oscillator that acts as a time base, wherein the autocorrelation values of the received signal are determined as a function of a received baud-rate sample signal.

21. The system of claim 19 wherein the baseband section determines pre-normalized autocorrelation function values of the received signal.

22. The system of claim 19 wherein the baseband section determines pre-normalized autocorrelation values, Ratio[i], given by:

$$\text{Ratio}[i] = \left| \frac{1}{144} \sum_{k=i\times 9}^{k=i\times 9+143} \frac{y[k] \cdot y^*[k-8]}{|y[k] \cdot y[k-8]|} \right|^2$$

wherein y[k] is a received baud-rate sample signal.

23. The system of claim 19 wherein the baseband section determines post-normalized autocorrelation function values of the received signal.

24. The system of claim 19 wherein the baseband section determines post-normalized autocorrelation values, Ratio[i], given by:

$$\text{Ratio}_{post}[i] = \frac{\left| \sum_{k=i\times 9}^{k=i\times 9+143} y[k] \cdot y^*[k-8] \right|^2}{\left| \sum_{k=i\times 9-4}^{k=i\times 9+139} |y[k]|^2 \right|^2}$$

wherein y[k] is a received baud-rate sample signal.

25. The system of claim 19 wherein the baseband section removes a DC offset from the received signal before determining the autocorrelation function values of the received signal.

26. A wireless communication system comprising:
  a receiver that provides a received signal wherein a frequency bias is applied to the received signal when a frequency burst (FB) has not yet been detected and the frequency bias is removed once the FB has been detected, the receiver further including:
  a FB filter that filters the received signal when an FB has not yet been detected for the received signal, and
  a channelization filter that filters the received signal after an FB has been detected for the received signal;
  a baseband section, coupled to the receiver, that designates the received signal as an FB signal if autocorrelation function values thereof exhibit a substantial peak,
  wherein determining the autocorrelation function values of the received signal is performed by determining post-normalized autocorrelation values using a predetermined delay lag combined with a predetermined plurality of symbols.

27. The system of claim 26 wherein the FB filter is a narrowband filter exhibiting a bandwidth less than the bandwidth of the channelization filter.

28. The system of claim 26 wherein the receiver includes a digitally compensated crystal oscillator that acts as a time base, wherein the autocorrelation values of the received signal are determined as a function of a received baud-rate sample signal.

29. The system of claim 26 wherein the baseband section determines pre-normalized autocorrelation function values of the received signal.

30. The system of claim 26 wherein the baseband section determines pre-normalized autocorrelation values, Ratio[i], given by:

$$\text{Ratio}[i] = \left| \frac{1}{144} \sum_{k=i\times 9}^{k=i\times 9+143} \frac{y[k] \cdot y^*[k-8]}{|y[k] \cdot y[k-8]|} \right|^2$$

wherein y[k] is a received baud-rate sample signal.

31. The system of claim 26 wherein the baseband section determines post-normalized autocorrelation function values of the received signal.

32. The system of claim 26 wherein the baseband section determines post-normalized autocorrelation values, Ratio[i], given by:

$$\text{Ratio}_{post}[i] = \frac{\left| \sum_{k=i\times 9}^{k=i\times 9+143} y[k] \cdot y^*[k-8] \right|^2}{\left| \sum_{k=i\times 9-4}^{k=i\times 9+139} |y[k]|^2 \right|^2}$$

wherein y[k] is a received baud-rate sample signal.

33. The system of claim 26 wherein the baseband section removes a DC offset from the received signal before determining the autocorrelation function values of the received signal.

34. A method of acquiring a radio frequency burst (FB) signal in a wireless communication device, comprising:
  receiving a radio frequency signal at a receiver;
  filtering the radio frequency signal with an FB filter if an FB has not yet been detected for the radio frequency signal;
  applying a frequency bias to the radio frequency signal when an FB has not yet been designated and removing the frequency bias once the FB has been designated;
  at a baseband section, designating the radio frequency signal as an FB when autocorrelation function values thereof exhibit a substantial peak; and
  continuing to filter the radio frequency signal with the channelization filter after the FB is detected,
  wherein determining the autocorrelation function values of the received signal is performed by determining post-normalized autocorrelation values using a predetermined delay lag combined with a predetermined plurality of symbols.

35. The method of claim 34 further including controlling the operating frequency of the wireless communication device with a digitally compensated crystal oscillator used as a time base, wherein the autocorrelation values of the received signal are determined as a function of a received baud-rate sample signal.

36. The method of claim 34 further including determining the autocorrelation function values of the radio frequency signal by determining pre-normalized autocorrelation function values.

37. The method of claim 34 further including determining the autocorrelation function values of the radio frequency signal by determining pre-normalized autocorrelation values, Ratio[i], given by:

$$\mathrm{Ratio}[i] = \left| \frac{1}{144} \sum_{k=i\times 9}^{k=i\times 9+143} \frac{y[k]\cdot y^*[k-8]}{|y[k]\cdot y[k-8]|} \right|^2$$

wherein y[k] is a received baud-rate sample signal.

38. The method of claim 34 further including determining the autocorrelation function values of the radio frequency signal by determining post-normalized autocorrelation function values.

39. The method of claim 34 further including determining the autocorrelation function values of the radio frequency signal by determining post-normalized autocorrelation values, Ratio[i], given by:

$$\mathrm{Ratio}_{post}[i] = \frac{\left| \sum_{k=i\times 9}^{k=i\times 9+143} y[k]\cdot y^*[k-8] \right|^2}{\left| \sum_{k=i\times 9-4}^{k=i\times 9+139} |y[k]|^2 \right|^2}$$

wherein y[k] is a received baud-rate sample signal.

40. The method of claim 34 further including removing a DC offset from the radio frequency signal before determining the autocorrelation values of the radio frequency signal.

* * * * *